United States Patent
Shinogle

(10) Patent No.: US 7,080,615 B2
(45) Date of Patent: *Jul. 25, 2006

(54) SYSTEM AND METHOD FOR ACTUATING AN ENGINE VALVE

(75) Inventor: Ronald D. Shinogle, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/143,740

(22) Filed: Jun. 3, 2005

(65) Prior Publication Data
US 2005/0274342 A1 Dec. 15, 2005

Related U.S. Application Data

(63) Continuation of application No. 10/673,241, filed on Sep. 30, 2003, now Pat. No. 6,935,287.

(51) Int. Cl.
*F01L 1/34* (2006.01)

(52) U.S. Cl. .............. 123/90.16; 123/90.12; 123/90.11; 123/90.15; 123/198 F; 251/129.06; 251/129.07; 251/129.08

(58) Field of Classification Search ........... 123/90.16, 123/198 F
See application file for complete search history.

(56) References Cited

U.S. PATENT DOCUMENTS

| | | | |
|---|---|---|---|
| 3,250,068 A | 5/1966 | Vulliamy | |
| 4,269,388 A | 5/1981 | Seilly | |
| 4,424,790 A | 1/1984 | Curtil | |
| 4,466,390 A | 8/1984 | Babitzka et al. | |
| 4,561,253 A | 12/1985 | Curtil | |
| 4,593,658 A * | 6/1986 | Moloney | 123/90.11 |
| 4,696,265 A * | 9/1987 | Nohira | 123/90.16 |
| 4,815,423 A | 3/1989 | Holmer | |
| 5,408,979 A | 4/1995 | Backlund et al. | |
| 5,445,128 A | 8/1995 | Letang et al. | |
| 5,682,854 A | 11/1997 | Ozawa | |
| 5,927,075 A | 7/1999 | Khair | |
| 6,026,786 A | 2/2000 | Groff et al. | |

(Continued)

FOREIGN PATENT DOCUMENTS

JP 05106415 A2 4/1993

(Continued)

OTHER PUBLICATIONS

Edwards et al., "The Potential of a Combined Miller Cycle and Internal EGR Engine for future Heavy Duty Trucl Applications," The Engineering Society for Advancing Mbility Land Sea Air and Space International, International Congree and Exposition, Feb. 23-26, 1998, pp. 1-19.

(Continued)

*Primary Examiner*—Thomas Denion
*Assistant Examiner*—Kyle M. Riddle
(74) *Attorney, Agent, or Firm*—Finnegan, Henderson, Farabow, Garrett & Dunner LLP

(57) ABSTRACT

An engine valve actuation system is provided that includes an engine valve that is movable between a first position where the engine valve prevents a flow of fluid and a second position where the engine valve allows a flow of fluid. A cam assembly is operatively connected to the engine valve to move the engine valve between the first position and the second position in a predetermined actuation pattern. A valve actuator having a piezo electric device is operable to change the movement of the engine valve from the predetermined actuation pattern. A controller is adapted to control the piezo electric device to achieve a desired valve actuation pattern.

16 Claims, 9 Drawing Sheets

U.S. PATENT DOCUMENTS

| | | | |
|---|---|---|---|
| 6,082,328 | A | 7/2000 | Meistrick et al. |
| 6,170,441 | B1 | 1/2001 | Haldeman et al. |
| 6,209,516 | B1 | 4/2001 | Yamashita |
| 6,237,551 | B1 | 5/2001 | Macor et al. |
| 6,267,107 | B1 | 7/2001 | Ward |
| 6,273,076 | B1 | 8/2001 | Beck et al. |
| 6,279,550 | B1 | 8/2001 | Bryant |
| 6,301,887 | B1 | 10/2001 | Gorel et al. |
| 6,301,889 | B1 | 10/2001 | Gladden et al. |
| 6,302,076 | B1 | 10/2001 | Bredy |
| 6,374,784 | B1 | 4/2002 | Tischer et al. |
| 6,467,452 | B1 | 10/2002 | Duffy et al. |
| 6,571,765 | B1 | 6/2003 | Kuboshima et al. |
| 6,601,563 | B1 * | 8/2003 | Funke et al. ............... 123/321 |
| 6,651,618 | B1 | 11/2003 | Coleman et al. |
| 6,655,329 | B1 * | 12/2003 | Kammerdiener et al. 123/90.16 |
| 6,688,280 | B1 | 2/2004 | Weber et al. |

FOREIGN PATENT DOCUMENTS

| | | |
|---|---|---|
| JP | 2000120457 A | 4/2000 |
| JP | 2000145484 A | 5/2000 |
| WO | WO 98/02653 | 1/1998 |

OTHER PUBLICATIONS

Obert, "Internal Combustion Engines and Air Pollution," Based on Internal Combustion Engines, Third Edition, 1973, pp. 612-614.

Challen et al., "Diesal Engine Reference Book, Section Edition," SAE International, 1999, pp. 75, 81, 84, 146, and 263-305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146-150.

Request for Inter Partes Reexamination Transmittal Form for US Patent 6,688,280, and Attachment to Request for Inter Parted Reexamination Transmittal For, Sep. 17, 2004.

Request for Inter Partes Reexamination Tramittal Form for US Patent 6,651,618, and Attachment to Request for Inter Partes Reexamination Form, Aug. 27, 2004, http://www.mazda.com/au/corpora/209.html, Oct. 16, 2001, pp. 1-6.

* cited by examiner

SYSTEM AND METHOD FOR ACTUATING AN ENGINE VALVE

This is a continuation of application Ser. No. 10/673,241, filed Sep. 30, 2003, now U.S. Pat. No. 6,935,287 which is incorporated herein by reference.

TECHNICAL FIELD

The disclosed invention is directed to a system and method for actuating an engine valve and, more particularly, to a system and method for controlling an engine valve actuator having a piezo electric device.

BACKGROUND

The operation of an internal combustion engine, such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches such as, for example, engine gas recirculation and aftertreatments, have been found to reduce the amount of emissions generated during the operation of an engine. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation pattern of the engine valves. For example, the actuation pattern of the intake and exhaust valves may be modified to implement a variation on the typical diesel or Otto cycle known as the Miller cycle. In a "late intake" type Miller cycle, the intake valves of the engine are held open during a portion of the compression stroke of the piston. Implementing a pattern variation, such as the late-intake Miller cycle, may improve the overall efficiency of the engine.

The engine valves in an internal combustion engine are typically driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs valve lift during valve actuation. The relationship of valve lift to cam angle, as dictated by the shape of the cam, creates a predetermined engine valve actuation pattern as the cam is rotated.

An engine valve actuation system may include a hydraulic actuator that is adapted to vary the valve actuation pattern established by the shape of the cam. For example, as described in U.S. Pat. No. 6,237,551 to Macor et al., issued on May 29, 2001, an engine valve actuation system may include a hydraulic actuator that establishes a hydraulic link between the cam and the intake valve. When the link is established, the valve will be actuated according to the shape of the cam to produce a predetermined valve actuation pattern of valve opening and valve closing. However, when the hydraulic link is broken, such as by opening a control valve, the force of a valve return spring causes the engine valve to close. Thus, breaking the hydraulic link allows the engine valve to move through an actuation pattern different from the predetermined pattern that would be achieved by the shape of the cam.

However, the operational performance of the hydraulic actuator may depend upon the viscosity of the operating fluid. When the operating fluid is cold, such as when the engine is starting, the hydraulic actuator may experience slow response times. The slow response times may lead to the engine experiencing rough running conditions or difficulty starting until the operating fluid is warmed enough to allow the hydraulic actuator to operate properly. Depending upon the current environmental conditions, the engine may need to operate for a period of time to warm the operating fluid so that the hydraulic actuator will operate as expected.

In addition, a hydraulic actuator, such as described in the '551 patent to Macor, may not be able to actuate the engine valve independently of the cam assembly. The force exerted by the engine valve springs may be insurmountable with a hydraulic actuator that is limited by the pressure and velocity of fluid supplied by a low pressure fluid supply system. An increase in the demand for force or response time could require additional capacity of the fluid source, typically resulting in an increase in the cost of the engine as well as a decrease in overall efficiency of the engine.

The engine valve actuation system of the disclosed invention solves one or more of the problems set forth above.

SUMMARY OF THE INVENTION

In one aspect, the disclosed invention is directed to an engine valve actuation system that includes an engine valve that is movable between a first position where the engine valve prevents a flow of fluid and a second position where the engine valve allows a flow of fluid. A cam assembly is operatively connected to the engine valve to move the engine valve between the first position and the second position in a predetermined actuation pattern. A valve actuator having a piezo electric device is operable to change the movement of the engine valve from the predetermined actuation pattern. A controller is adapted to control the piezo electric device to achieve a desired valve actuation pattern.

In another aspect, the disclosed invention is directed to a method of actuating an engine valve. A cam assembly is operated to move an engine valve in a predetermined pattern between a first position where the engine valve blocks a flow of fluid and a second position where the engine valve allows a flow of fluid. A valve actuator having a piezo electric device is operated to selectively engage the engine valve. The piezo electric device of the valve actuator is controlled to achieve a desired valve actuation pattern.

DETAILED DESCRIPTION

Figure 1:
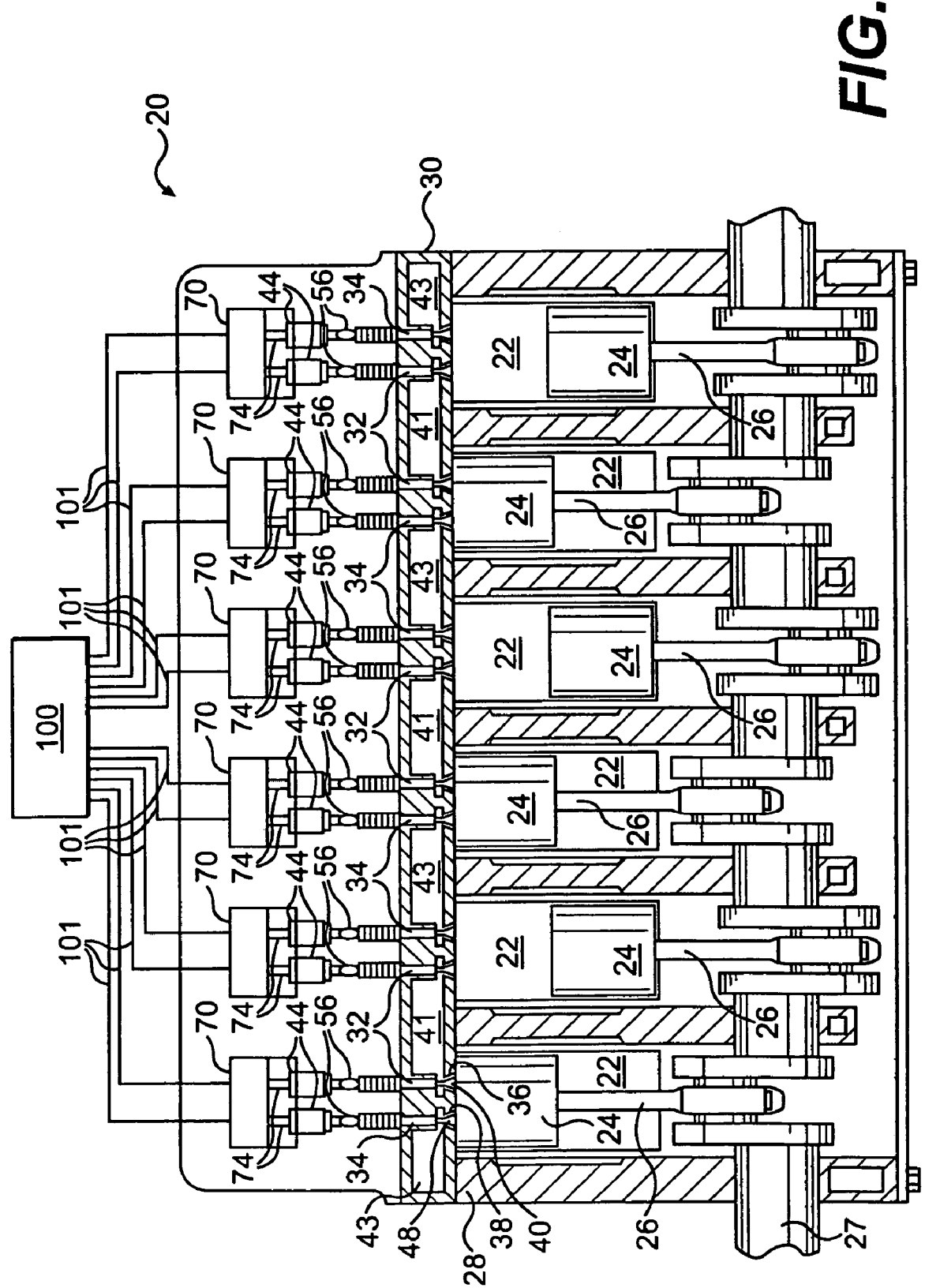
FIG. 1 is a diagrammatic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 includes an engine block 28 that defines a plurality of cylinders 22. A piston 24 is slidably disposed within each cylinder 22. In the illustrated embodiment; engine 20 includes six cylinders 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to move or "lift" valve element 40 to thereby open the respective intake port 36. In a cylinder 22 having a pair of intake ports 36 and a pair of intake valves 32, the pair of intake valves 32 may be actuated by a single valve actuation assembly or by a pair of valve actuation assemblies.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to move or "lift" valve element 48 to thereby open the respective exhaust port 38. In a cylinder 22 having a pair of exhaust ports 38 and a pair of exhaust valves 34, the pair of exhaust valves 34 may be actuated by a single valve actuation assembly 44 or by a pair of valve actuation assemblies 44.

Figure 2:
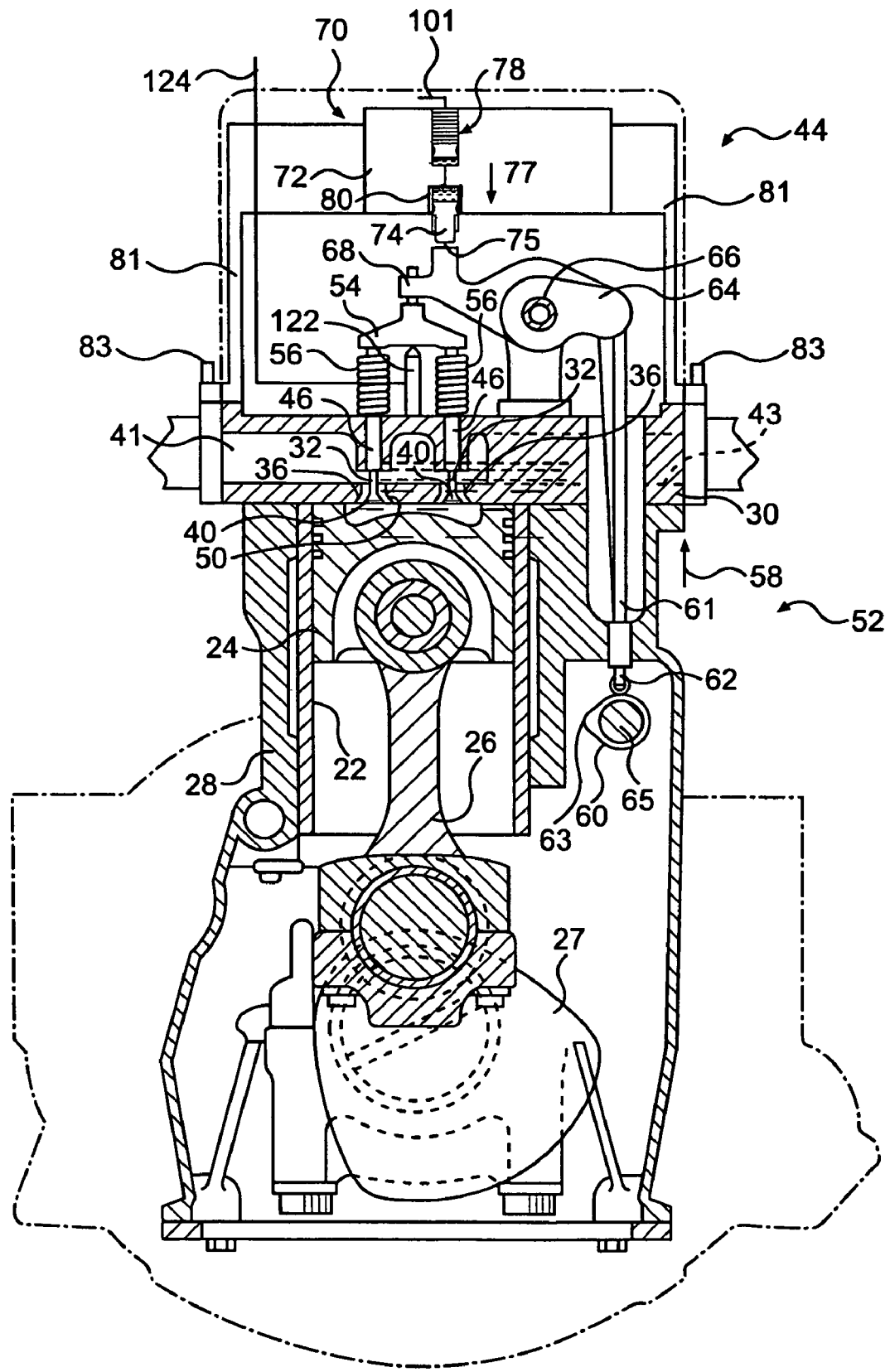
FIG. 2 is a diagrammatic cross-sectional view of a cylinder and valve actuation assembly in accordance with an exemplary embodiment of the disclosed invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As also shown in FIG. 2, a valve actuation assembly 44 is operatively associated with intake valves 32. Valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 2, the cam assembly 52 includes a cam 60 having a cam lobe 63 and mounted on a camshaft 65, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. The shape of cam 60 governs valve lift during valve actuation. The relationship of valve lift to cam angle as dictated by the shape of the cam 60, creates a predetermined engine valve actuation pattern as the cam 60 is rotated.

Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear train assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 actuates intake valves 32 in a predetermined pattern. Because cam assembly 52 is connected to crankshaft 27, the timing of the predetermined intake valve actuation pattern may be synchronized with the motion of the associated engine piston 24. For example, intake valves 32 may be actuated to open intake ports 36 when piston 24 is moving from a top-dead-center position towards a bottom-dead-center position in an intake stroke to allow air to flow from intake passageway 41 into cylinder 22.

A similar valve actuation assembly may be connected to exhaust valves 34. A second cam (not shown) may be connected to crankshaft 27 to actuate exhaust valves 34 in a predetermined actuation pattern. The timing of the predetermined exhaust valve actuation pattern may also be synchronized with the motion of the associated engine piston 24. For example, exhaust valves 34 may be actuated to open exhaust ports 38 when piston 24 is moving from a bottom-dead-center position towards a top-dead-center position to allow exhaust to flow from cylinder 22 into exhaust passageway 43.

As also shown in FIG. 2, valve actuation assembly 44 may include an actuator 70. Actuator 70 includes a housing 72 that defines a bore 80. A piston 74 having an end 75 may be slidably disposed in bore 80.

Housing 72 of actuator 70 may be connected to cylinder head 30. For example, a pair of supports 81 may extend from housing 72 to cylinder head 30. Supports 81 may be attached to cylinder head 30 by any connecting member readily apparent to one skilled the art. For example, bolts 83 may connect supports 81 to cylinder head 30.

Housing 72 may be disposed on cylinder head 30 to allow end 75 of piston 74 to operatively engage intake valves 32. In the illustrated embodiment, end 75 of piston 74 may selectively engage end 68 of rocker arm 64. One skilled in the art will recognize, however, that end 75 of piston 74 may engage another portion of rocker arm 64 or end 75 of piston 74 may be operatively engaged with intake valves 32 in another way, such as, for example, through a direct connection with intake valves 32.

Actuator 70 may include one or more piezo electric devices 78, 89, as shown in FIGS. 3–8, that are adapted to control the motion of piston 74 relative to bore 80. Piezo electric devices 78, 89 may include one or more columns of piezo electric crystals. Piezo electric crystals are structures with random domain orientations. These random orientations are asymmetric arrangements of positive and negative ions that exhibit permanent dipole behavior. When an electric field is applied to the crystals, such as, for example, by the application of a voltage, the piezo electric crystals expand along the axis of the electric field as the domains line up. As illustrated in the exemplary embodiments of FIGS. 3–8, one or more piezo electric devices may be utilized in a number of different configurations to control the motion of piston 74 relative to bore 80.

Figure 3:
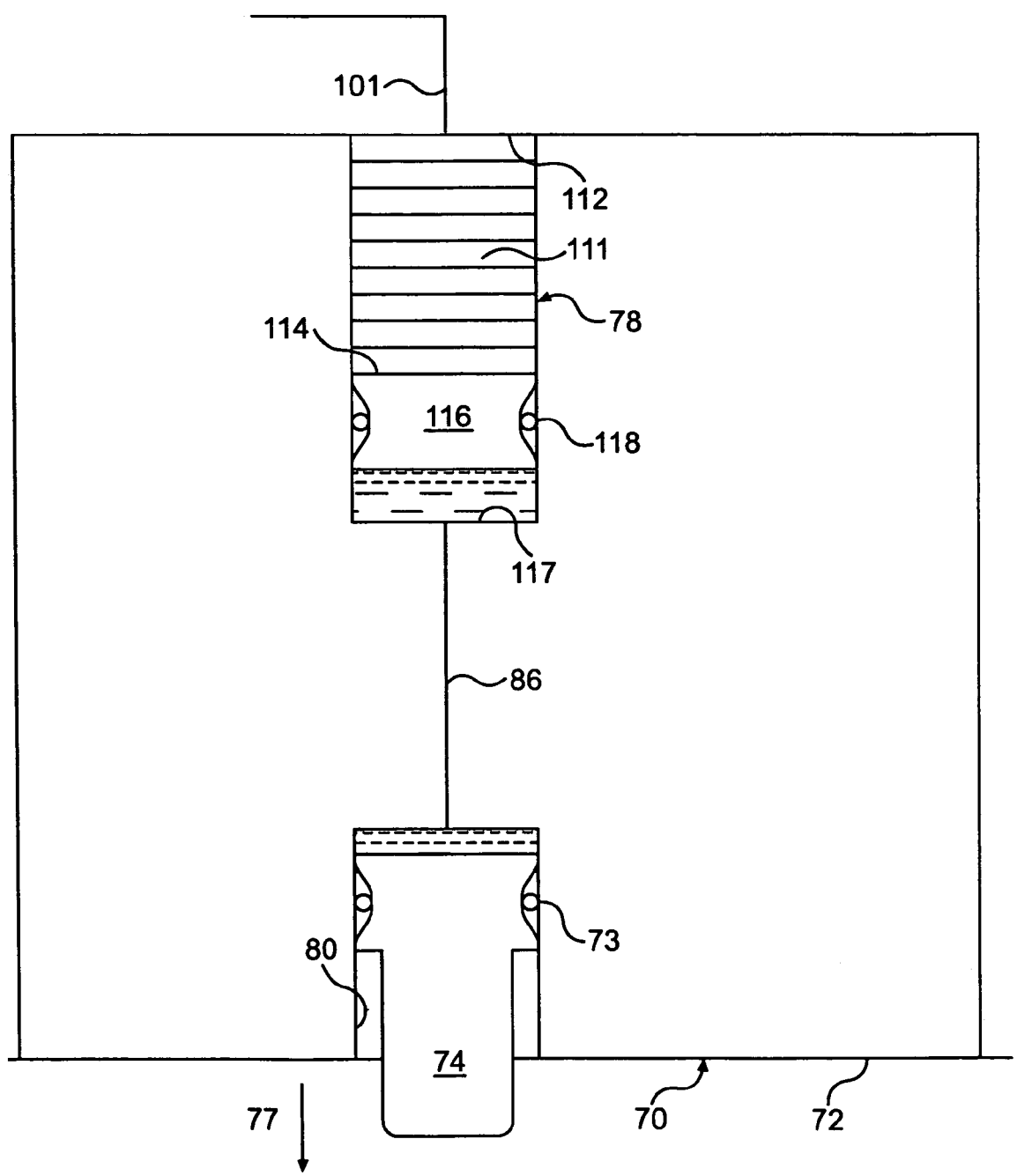
FIG. 3 is a schematic and diagrammatic illustration of an actuator for an engine valve in accordance with an exemplary embodiment of the disclosed invention.

For example, in the embodiment of FIG. 3, the piezo electric device 78 includes a column of crystals 111 having one end 112 that is securely fixed to actuator housing 72. A piston 116 is operably attached to the other end 114 of the piezo crystal column 111. Piston 116 may be slidably disposed within bore 117 of actuator housing 72. Bore 117 may contain a supply of hydraulic fluid that is in fluid communication with piston 74 by means of a passageway 86.

A voltage may be applied to the column of crystals 111 in piezo electric device 78 to cause column of crystals 111 to expand along an axis of bore 117. The expansion of column of crystals 111 moves piston 116 a distance into bore 117, thereby increasing the pressure of the fluid in bore 117 and in passageway 86. The pressurized fluid in passageway 86 flows into bore 80 and acts to move piston 74 in the direction indicated by arrow 77 and into engagement with rocker arm 64.

Piezo electric device 78 may be activated to move the associated intake valves 32 from the first position to the second position or piezo electric device 78 may be activated to prevent the associated intake valves 32 from moving from the second position to the first position. Piezo electric device 78 may be activated to engage piston 74 with rocker arm 64 when intake valves 32 are in the first position to move the intake valves 32 from the first position to the second position. Alternatively, piezo electric device 78 may be activated to engage piston 74 with rocker arm 64 when intake valves 32 are in the second position or are moving from the second position towards the first position. With either approach, piezo electric device 78 may be activated to vary the actuation pattern of the intake valves 32 from the predetermined actuation pattern dictated by the shape and orientation of cam 60.

Actuator 70 may include one or more seals that prevent fluid from leaking from the actuator housing 72. For example, a seal 73 may be disposed between piston 74 and bore 80. In addition, a second seal 118 may be disposed between piston 116 and bore 117. Seal 73 and seal 118 may be any type of sealing element adapted to prevent fluid from escaping from bore 80 past piston 74 or from bore 117 past piston 116.

Figure 4:
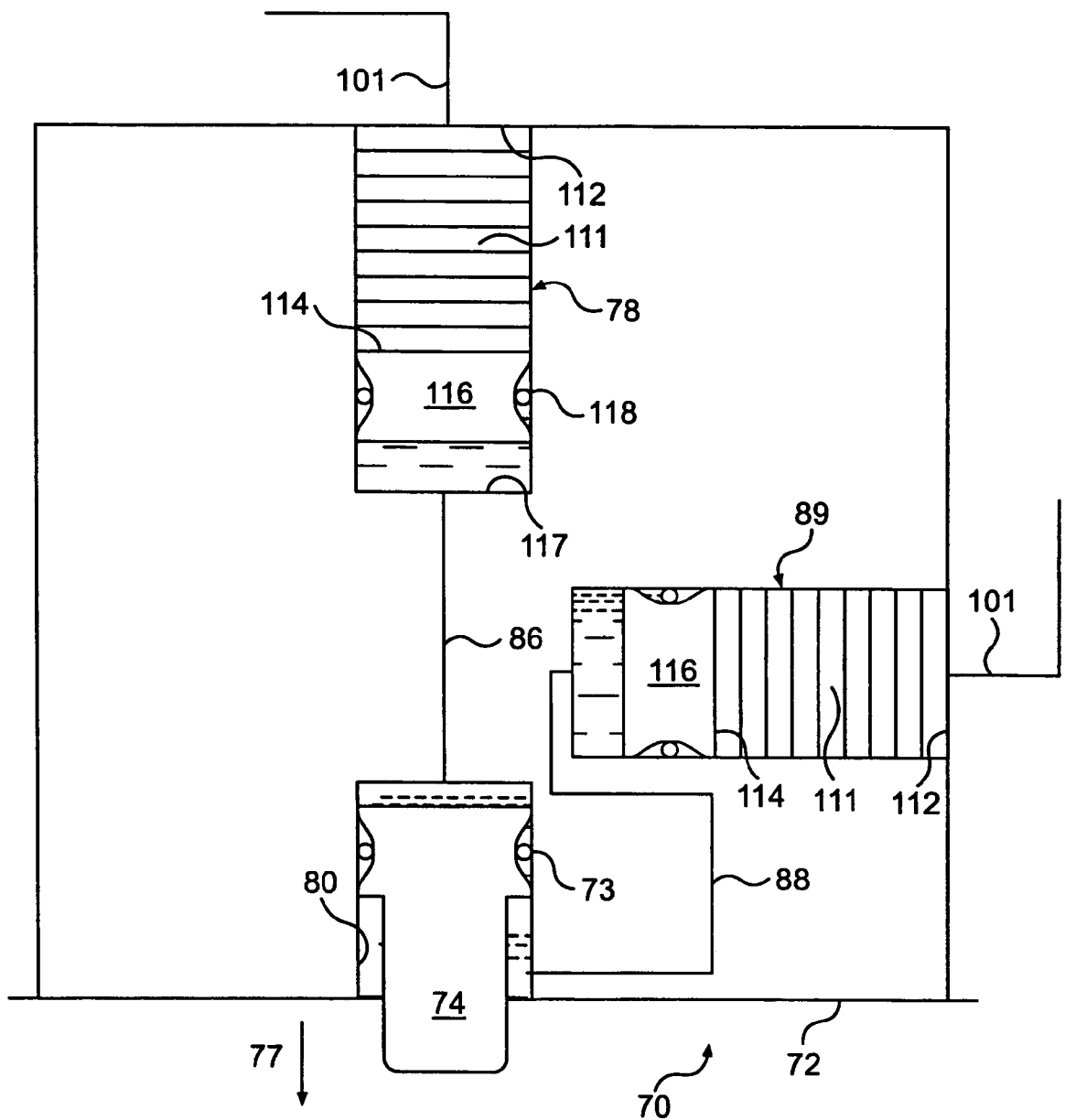
FIG. 4 is a schematic and diagrammatic illustration of an actuator for an engine valve in accordance with an exemplary embodiment of the disclosed invention.

As shown in FIG. 4, valve actuator 70 may also include a second piezo electric device 89. Second piezo electric device 89 may also include a column of crystals 111. One end 112 of column of crystals 111 may be fixed to actuator housing 72 and piston 116 may be connected to the other end of column of crystals 111. Second piezo electric device 89 may be in fluid connection with bore 80 by a fluid passageway 88. The application of a voltage to second piezo electric device 89 may cause the expansion of column of crystals 111 and the pressurization of fluid in fluid passageway 88. In this manner, second piezo electric device 89 may exert a force on piston 74 in an opposing direction to the force exerted by first piezo electric device 78. In this manner second piezo device 89 may act in conjunction with valve spring 56 to exert a force on piston 74 and associated intake engine valve 32 or exhaust engine valve 34 to move piston 74 in a direction opposite to the movement initiated by first piezo device 78.

Figure 5:
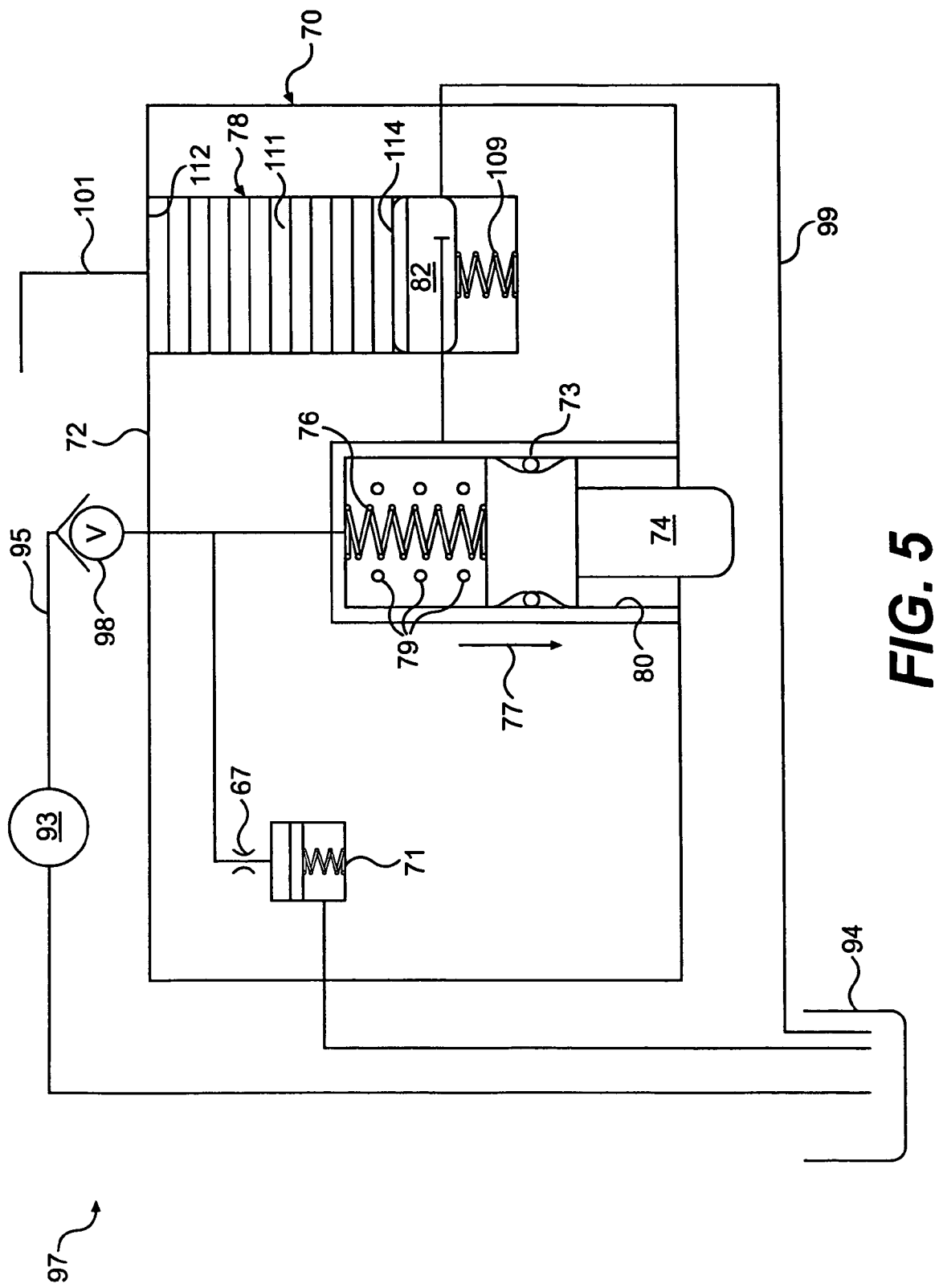
FIG. 5 is a schematic and diagrammatic illustration of an actuator for an engine valve in accordance with an exemplary embodiment of the disclosed invention.

Alternatively, as shown in the embodiment of FIG. 5, a mechanical biasing means may be disposed in bore 80. The mechanical biasing means acts on piston 74 to bias piston 74 away from housing 72, i.e. in the direction of arrow 77. The mechanical biasing means may be any mechanical biasing element, such as, for example, a spring 76, that is adapted to bias piston 74 with respect to housing 72. The force exerted by mechanical biasing means may be less than the force exerted by springs 56 (referring to FIG. 2) on bridge 54.

Actuator 70 may also receive operating fluid from a common source. For example, as also shown in FIG. 5, a fluid supply system 97 may supply operating fluid to actuator 70 through fluid line 95. Fluid supply system 97 may include a source of fluid 93, that draws fluid from a tank 94 holding a supply of fluid, which may be, for example, a hydraulic fluid, a lubricating oil, a transmission fluid, or fuel. Source of fluid 93 may increase the pressure of the fluid and direct the fluid into actuator 70. Source of fluid 93 and fluid line 95 may be part of a lubrication system, such as typically accompanies an internal combustion engine. Fluid line 95 may contain pressurized fluid having a pressure of, for example, less than 700 kPa (100 psi) or, more particularly, between about 210 kPa and 620 kPa (30 psi and 90 psi). Alternatively, the source of hydraulic fluid may be a pump configured to provide fluid at a higher pressure, such as, for example, between about 10 MPa and 35 MPa (1450 psi and 5000 psi).

One skilled in the art will recognize that fluid supply system 97 may have a variety of different configurations and include a variety of different components. For example, a snubbing valve 79 may be disposed in fluid line 95 between bore 80 and control valve 82. Snubbing valve 79 may be configured to decrease the rate at which fluid exits bore 80 to thereby slow the rate at which piston 74 moves within bore 80. A damping system may also be implemented that prevents pressure oscillations in actuator 70, which may include an accumulator 71 and a restricted orifice 67 as in FIG. 5. One or more check valves may be included. A check valve 98, for example, may be disposed in line 95, between source 93 and actuator 70 as seen in FIGS. 5 and 6.

A seal 73 may be disposed between piston 74 and bore 80. Seal 73 may be any type of sealing element adapted to prevent fluid from escaping from bore 80 past piston 74.

Housing 72 may further define fluid passageway 95 to connect tank 94 with bore 80. Fluid passageway 95 provides a fluid connection that allows fluid to flow between tank 94 and bore 80. For example, fluid may flow from tank 94 to bore 80 as spring 76 biases piston 74 away from housing 72. In addition, fluid may flow from tank 94 to bore 80 as rocker arm 64 (referring to FIG. 2) pivots away from actuator 70 to thereby move piston 74 to follow the motion of rocker arm 64.

Figure 6:
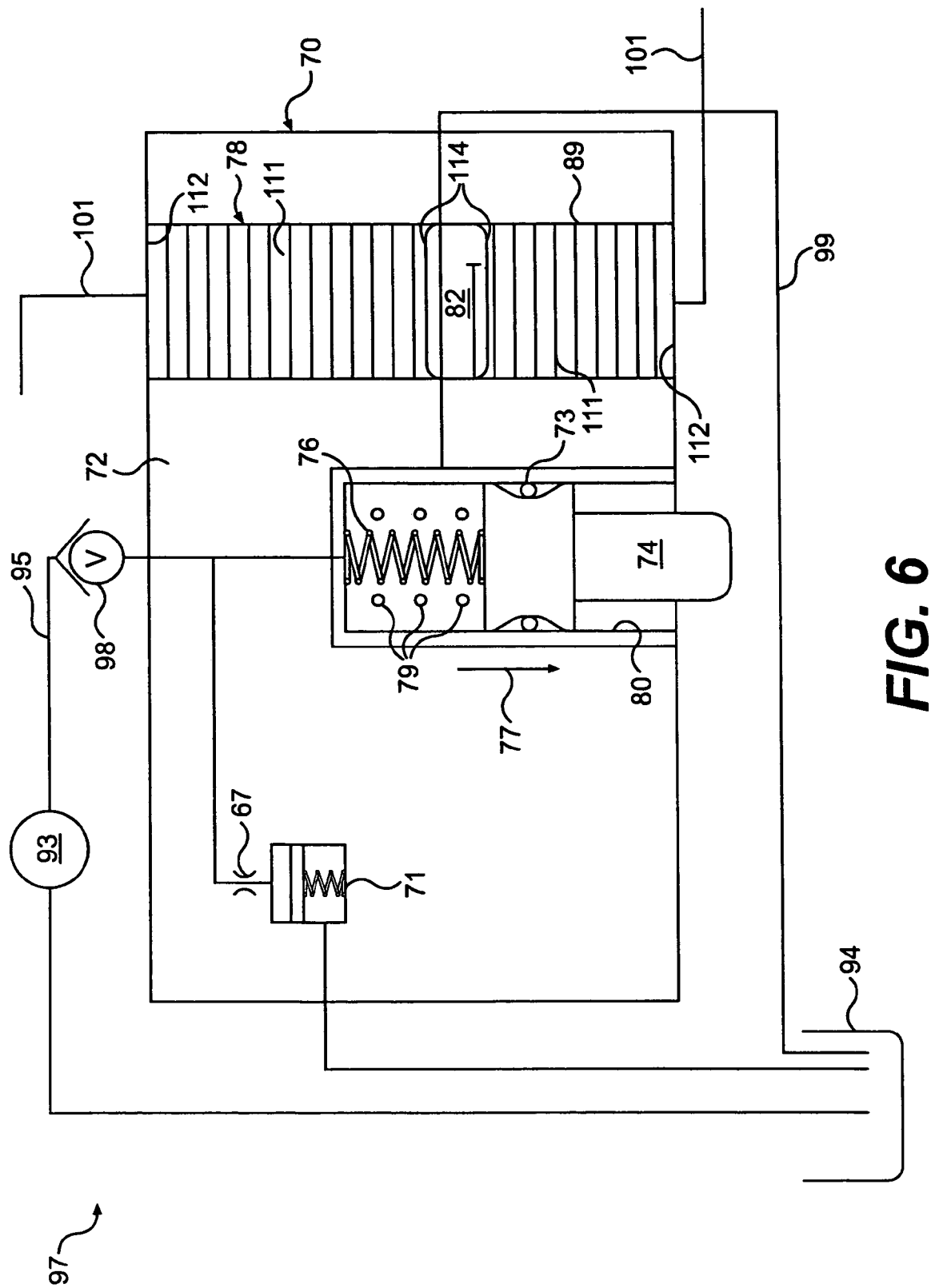
FIG. 6 is a schematic and diagrammatic illustration of an actuator for an engine valve in accordance with an exemplary embodiment of the disclosed invention.

As shown in FIGS. 5–6, a control valve 82 may be positioned in a fluid line 99 between bore 80 and tank 94. Control valve 82 may be moved between a first position where fluid is allowed to flow through fluid passageways 95 and 99 and a second position where fluid is prevented from flowing through fluid passageways 95 and 99. Control valve 82 may be moved to the second position to prevent fluid from flowing from bore 80 to thereby prevent piston 74 from moving relative to bore 80.

As shown in the embodiments of FIGS. 5–6, piezo electric device 78 may be operably connected to control valve 82. Piezo electric device 78 may be arranged such that one end 112 is securely fixed to actuator housing 72 and column of crystals 111 extends away from fixed end 112 in a substantial alignment with control valve 82. The other end 114 of column of crystals 111 may be operably connected to control valve 82. A voltage may be applied to piezo electric device 78 to expand column of crystals 111 to cause an opening movement of control valve 82. In this manner, piezo electric device 78 may be operated to allow a flow of fluid from bore 80 to tank 94.

As shown in FIG. 5, control valve 82 may include a return spring 109 that acts to close control valve 82. The closing of control valve 82 stops the flow of fluid from bore 80 and thereby prevents piston 74 from moving relative to bore 80. Control valve 82 may be closed when piston 74 is extended relative to actuator housing 72. In this position, piston 74 may engage rocker arm 64 (referring to FIG. 2) when intake valves 32 are moving from the second position to the first position. The engagement of the piston 74 with the rocker arm 64 prevents intake valves 32 from moving to the first, or closed position. In this manner, the expansion of the piezo electric device 78 may be controlled to control the motion of piston 74 and thereby change the predetermined valve actuation pattern of the intake valves 32.

In addition, as shown in FIG. 6, second piezo electric device 89 may be used to close control valve 82. Column of crystals 111 in second piezo electric device 89 may be disposed between actuator housing 72 and control valve 82. Piezo electric device 89 may be activated to expand column of crystals 111 in an opposing direction to piezo electric device 78 to thereby move control valve 82 to the closed position to prevent piston 74 from moving relative to bore 80.

Figure 7:
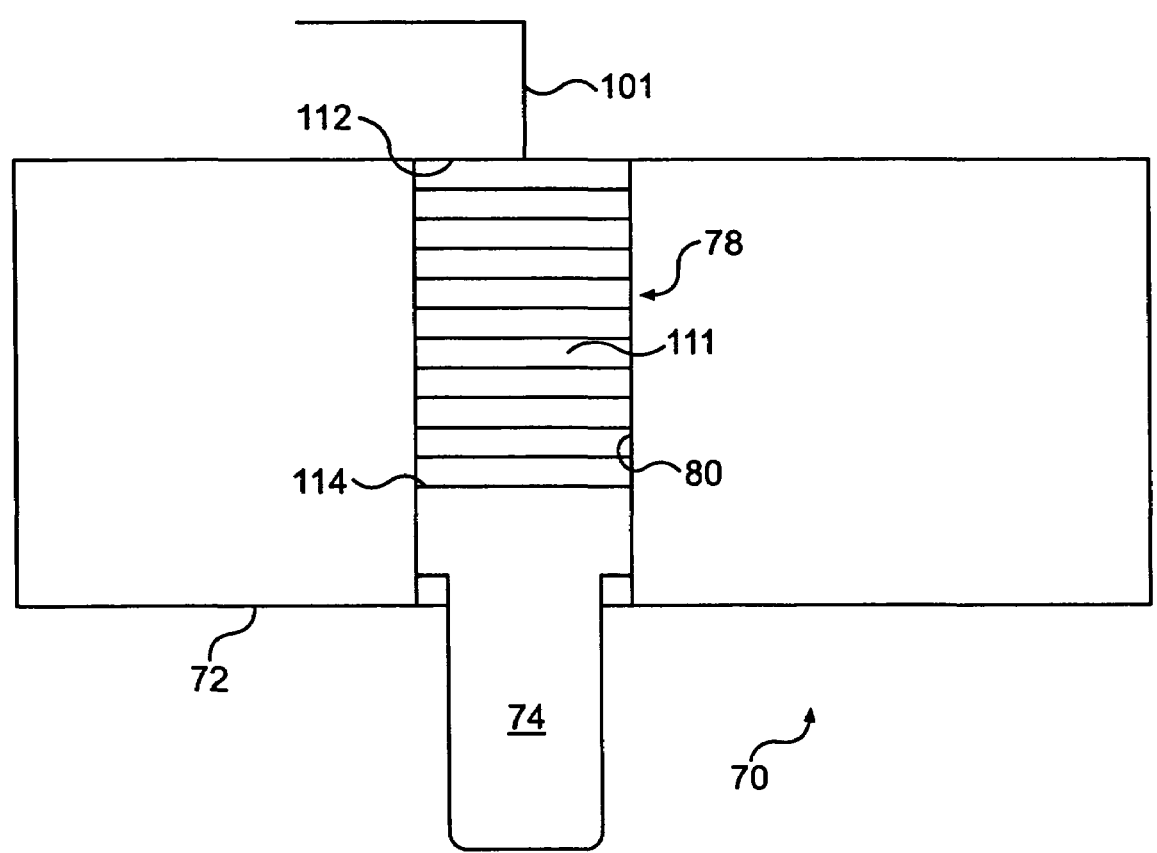
FIG. 7 is a schematic and diagrammatic illustration of an actuator for an engine valve in accordance with an exemplary embodiment of the disclosed invention.

Alternatively, as shown in the embodiment of FIG. 7, piezo electric device 78 may be arranged within valve actuator 70 to act directly on piston 74.

For example, first end 112 of piezo electric device 78 may be securely fixed to actuator housing 72 and column of crystals 111 may extend away from fixed end 112 and into bore 80. Second end 114 of column of crystals 111 is operably connected to piston 74. The activation of piezo electric device 78 may therefore exert a direct force on piston 74. As described previously, piezo electric device 78 may be activated to engage piston 74 with rocker arm 64 when the associated intake valves 32 are in either the first position or the second position to thereby change the predetermined valve actuation pattern.

Figure 8:
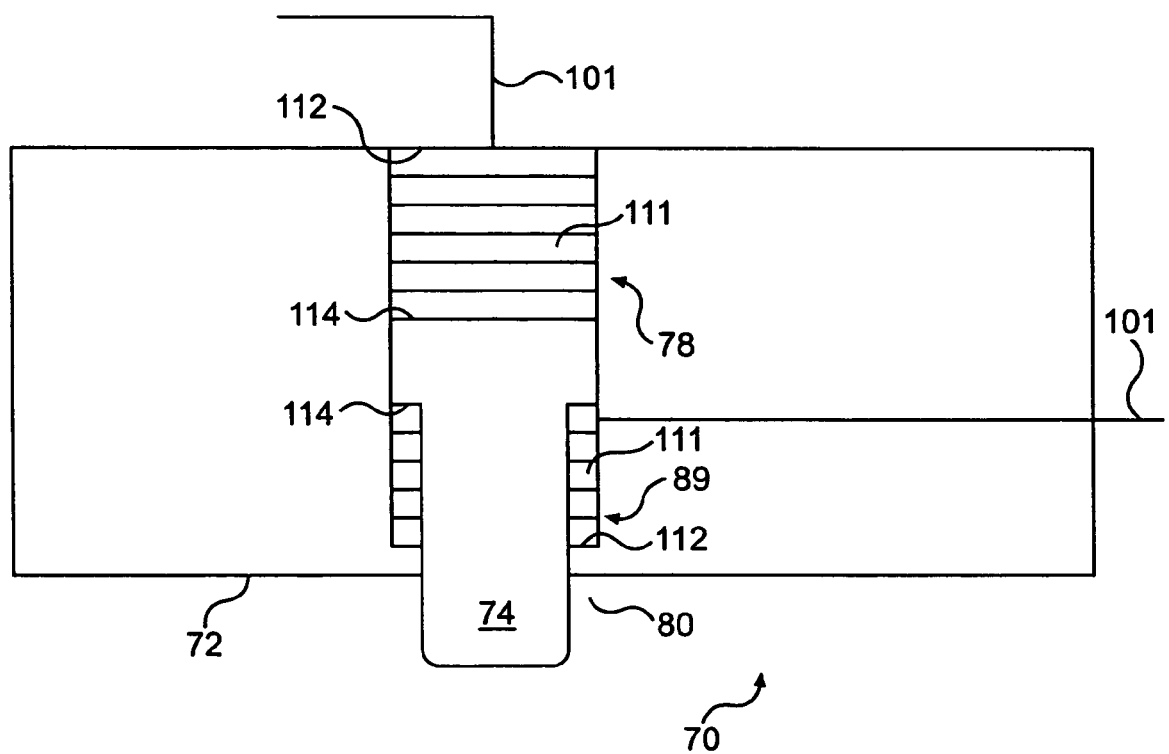
FIG. 8 is a schematic and diagrammatic illustration of an actuator for an engine valve in accordance with an exemplary embodiment of the disclosed invention.

As shown in FIG. 8, second piezo electric device 89 may be disposed between actuator housing 72 and piston 74. Second piezo electric device 89 may be activated to exert a force on piston 74 in an opposing direction to the force exerted by first piezo electric device 78. Second piezo device 89 may act in conjunction with valve spring 56 to exert a force on piston 74 and associated intake engine valve 32 or exhaust engine valve 34 to move piston 74 in a direction opposite to the movement initiated by first piezo device 78.

It should be noted that, while the embodiments of valve actuator 70 have been described in connection with intake valves 32, a valve actuator 70 may also be associated with the exhaust valves 34 of a particular engine cylinder 22 (referring to FIG. 1). Thus, the described valve actuator may be used to vary the predetermined valve actuation timing of intake valves 32 and/or exhaust valves 34.

As shown in FIG. 1, a controller 100 may be connected to valve actuator 70 in each valve actuation assembly 44. Controller 100 may include an electronic control module that has a microprocessor and a memory. As is known to those skilled in the art, the memory is connected to the microprocessor and stores an instruction set and variables. Associated with the microprocessor and part of the electronic control module are various other known circuits such as, for example, power supply circuitry, signal conditioning circuitry, and solenoid driver circuitry, among others.

As shown in FIG. 2, engine 20 may include a position sensor 122 associated with the engine valve 32 and in communication with controller 100 through lead 124. The position sensor 122 may be any type of position sensor known in the art such as, for example, a piezo crystal position sensor. A piezo crystal position sensor includes a piezo crystal that exerts a voltage proportional to the compression of the crystal.

The position sensor may be adapted to provide an indication of the position of the engine valve 32 to thereby monitor the lift height of the engine valve 32. In the embodiment of FIG. 2, the position sensor 122 is engaged with bridge 54. Alternatively, the position sensor 122 may be engaged directly to the engine valve 32, to the piston 74, or to the control valve 82.

Controller 100 may be programmed to control one or more aspects of the operation of engine 20. For example, controller 100 may be programmed to receive signals from the position sensor 122 indicative of valve position and control the valve actuation assembly based on the valve position. The controller may also be programmed to control the fuel injection system and any other function readily apparent to one skilled in the art. Controller 100 may control engine 20 based on the current operating conditions of the engine and/or instructions received from an operator. As shown in FIGS. 3–8, controller 100 is connected to piezo electric devices 78 and 89 in actuator housing 72 through a lead 101.

Controller 100 may be further programmed to receive information from one or more sensors operatively connected with engine 20. Each of the sensors may be configured to sense one or more operational parameters of engine 20. One skilled in the art will recognize that many types of sensors may be used in conjunction with engine 20. For example, engine 20 may be equipped with sensors configured to sense one or more of the following: the temperature of the engine coolant, the temperature of the engine, the ambient air temperature, the engine speed, the load on the engine, the intake air pressure, the position of the piston relative to the cylinder, and the pressure in the cylinder.

Figure 9:
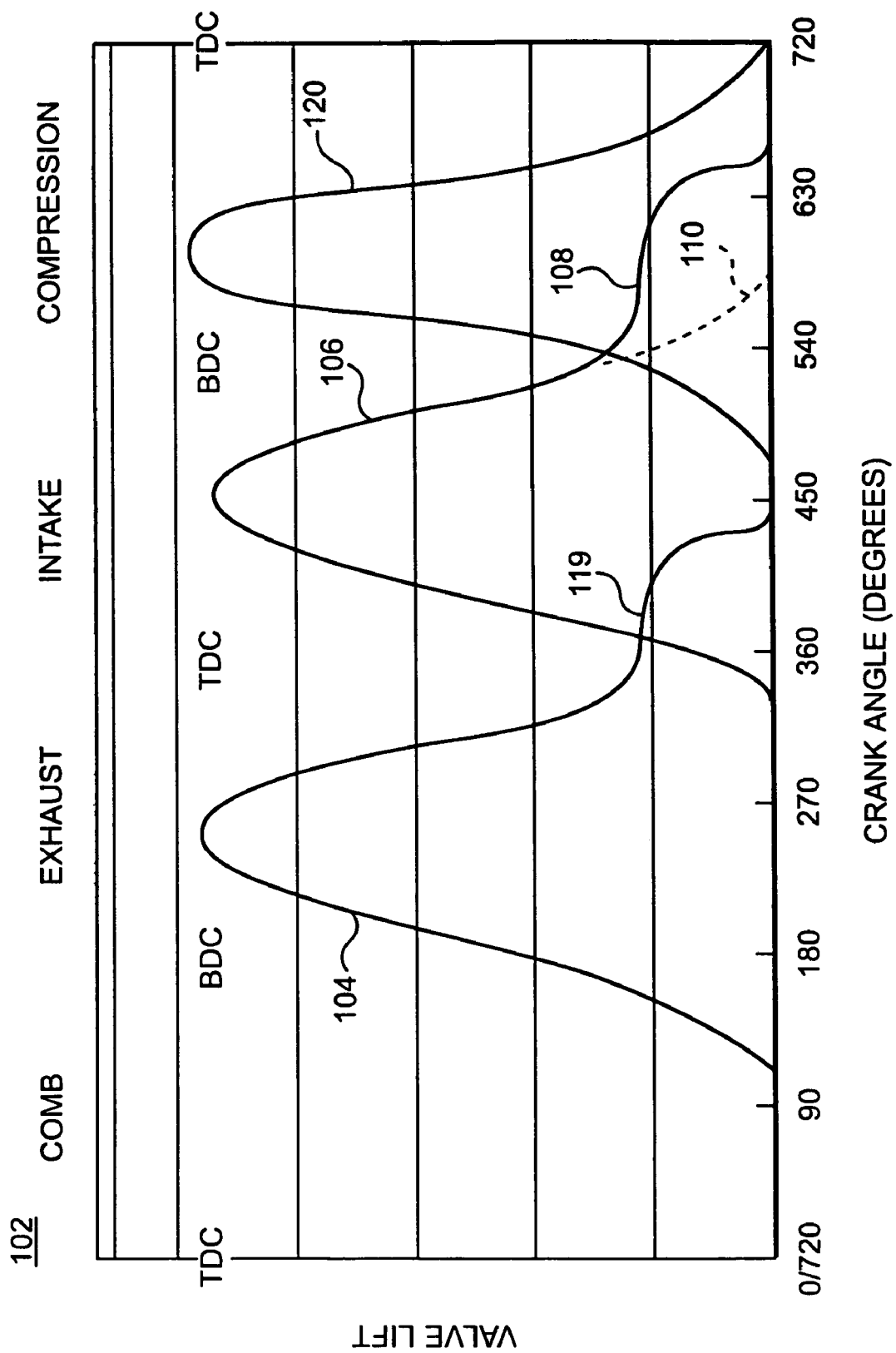
FIG. 9 is a graphic illustration of an exemplary valve actuation as a function of engine crank angle for an engine operating in accordance with the disclosed invention.

Engine 20 may be further equipped with a sensor configured to monitor the crank angle of crankshaft 27 to thereby determine the position of pistons 24 within their respective cylinders 22. The crank angle of crankshaft 27 is also related to actuation patterns of intake valves 32 and exhaust valves 34. An exemplary graph 102 indicating the relationship between valve actuation pattern and crank angle is illustrated in FIG. 9. As shown by graph 102, the exhaust valve lift 104 is timed to substantially coincide with the exhaust stroke of piston 24 and the intake valve lift 106 is timed to substantially coincide with the intake stroke of piston 24.

INDUSTRIAL APPLICABILITY

Based on information provided by the engine sensors, controller 100 may operate piezo electric device 78 and/or 89 in each valve actuation assembly 44 to change the actuation pattern of the intake and/or exhaust valves 32, 34 of engine 20 from the predetermined actuation pattern to a desired actuation pattern. For example, under certain operating conditions, controller 100 may implement a late intake Miller cycle in each cylinder 22 of engine 20. Under normal operating conditions, implementation of the late intake Miller cycle may increase the overall efficiency of the engine 20. However, under some operating conditions, such as, for example, when engine 20 is cold, controller 100 may operate engine 20 on a conventional diesel cycle.

The following discussion describes a valve actuation pattern control that results in the implementation of a late intake Miller cycle in a single cylinder 22 of engine 20. One skilled in the art will recognize that the disclosed system may be used to selectively implement a late intake Miller cycle in all cylinders of engine 20 in the same or a similar manner. In addition, the disclosed system may be used to implement other valve actuation variations on the conventional diesel cycle, such as, for example, a late exhaust closing 119 (see FIG. 9) used for an exhaust gas recirculation event, where exhaust valves 34 have a late closing during the intake stroke, an engine brake valve event 120 (see FIG. 9), where the exhaust valves 34 are opened during the peak of the compression stroke, or any other such timing variation that may be apparent to one skilled in the art.

Controller 100 may implement a late intake valve closing Miller cycle for a particular cylinder 22 by controlling the piezo electric device 78 in valve actuator 70. The rotation of cam 60 causes rocker arm 64 to pivot to thereby actuate intake valves 32 in a predetermined pattern. The predetermined pattern may cause intake valves 32 to move from the first position to the second position to coincide with a certain position of the associated engine piston 24.

In the embodiments of FIGS. 3–8, controller 100 may send a signal, such as, for example, a voltage having a certain magnitude, to activate piezo electric device 78 and thereby extend piston 74 in the direction of arrow 77 (referring to FIG. 2). The signal may be adapted to move piston 74 to a certain position where engagement with normal rocker arm 64 movement is initiated. As cam 60 continues to rotate, springs 56 urge intake valves 32 towards their closed position until end 68 of rocker arm 64 engages end 75 of piston 74 where piston 74 prevents intake valves 32 from closing. As long as piston 74 remains in the extended position, piston 74 will prevent springs 56 from returning intake valves 32 to the closed position. Thus, piezo electric device 78 will hold intake valves 32 in the open position, independent of the action of cam assembly 52.

Controller 100 may close intake valves 32 by sending a signal to piezo electric device 78, such as by removing the voltage applied to piezo electric device 78, thereby allowing crystal column 111 to compress or move towards its original position. In the embodiments of FIGS. 3, 5, 6 and 7, valve springs 56 may then act to move piston 74 away from its extended position. Alternatively, in the embodiments of FIGS. 4 and 8, second piezo device 89 may be activated to move piston 74 away from its extended position. This allows rocker arm 64 to pivot so that intake valves 32 are moved to the closed position.

An exemplary late intake closing 108 is compared in FIG. 9 to a closing 110 of the predetermined action pattern produced by the rotation of cam 60. As shown, the intake valve actuation 106 is extended into a portion of the compression stroke of piston 24. This allows some of the air in cylinder 22 to escape as piston 24 begins the compression stroke. The amount of air allowed to escape cylinder 22 may be controlled by adjusting the crank angle at which piston 74 exerts interfering pressure on rocker arm 64. Piston 74 may be engaged at an earlier crank angle to decrease the amount of escaping air or at a later crank angle to increase the amount of escaping air.

Certain operating conditions may require that engine 20 be operated on a conventional diesel cycle instead of the late intake Miller cycle described above. These types of operating conditions may be experienced, for example, when engine 20 is first starting or is otherwise operating under cold conditions. The described valve actuation system 44 allows for the selective disengagement of the late intake Miller cycle.

Controller 100 may disengage the late intake Miller cycle by controlling the piezo electric device 78 so as not to force the piston to apply pressure against rocker arm 64. If piezo device 78 is not causing piston 74 to apply pressure against rocker arm 64, intake valves 32 will not be blocked from returning to the closed position. Thus, the actuation of intake valves 32 will be driven by the shape of cam 60.

Thus, when piston 74 does not apply pressure against rocker arm 64, intake valves 32 will follow a conventional diesel cycle as governed by cam 60. As shown in FIG. 9, intake valve actuation 106 will follow a conventional closing 110. In the conventional closing 110, the closing of intake valves 32 substantially coincides with the end of the intake stroke of piston 24. When intake valves 32 close at the end of the intake stroke, no air will be forced from cylinder 22 during the compression stroke. This results in piston 24 compressing the fuel and air mixture to a higher pressure, which will facilitate diesel fuel combustion. This is particularly beneficial when engine 20 is operating in cold conditions.

As will be apparent from the foregoing description, the described system provides an engine valve actuation system that may selectively alter the pattern of the intake and/or exhaust valve actuation of an internal combustion engine. The actuation of the engine valves may be based on sensed operating conditions of the engine. For example, the engine valve actuation system may implement a late intake Miller cycle when the engine is operating under normal operating conditions. The late intake Miller cycle may be disengaged when the engine is operating under adverse operating conditions, such as when the engine is cold. Thus, the disclosed system and method provide a flexible engine valve actuation system that provides for a variety of enhanced performance capabilities and fuel efficiency gains.

It will be apparent to those skilled in the art that various modifications and variations can be made in the described engine valve actuation system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An engine valve actuation system, comprising:
   an engine intake valve movable between a first position where the engine intake valve prevents a flow of fluid and a second position where the engine intake valve allows a flow of fluid;
   a cam assembly operatively connected to the engine intake valve to move the engine intake valve between the first position and the second position in a predetermined actuation pattern;
   a valve actuator having a piezo electric device, and being operable to change the movement of the engine intake valve from the predetermined actuation pattern by pressurizing a fluid passageway by the piezo electric device; and
   a controller adapted to control the piezo electric device to achieve a desired valve actuation pattern.

2. The valve actuation system of claim 1, wherein the valve actuator further includes:
   an actuator housing defining a bore; and
   a piston slidably disposed in the bore of the actuator housing and adapted to engage the engine intake valve, wherein the piston is configured to be moved by the pressurizing of the fluid passageway.

3. The valve actuation system of claim 2, further including a second fluid passageway pressurized by a second piezo electric device arranged such that force generated by the second piezo electric device opposes movement caused by the first piezo electric device to move the piston in a direction opposite the movement initiated by the first piezo electric device.

4. The valve actuation system of claim 1, further including:
   an actuator housing defining a bore; and
   a piston slidably disposed in the bore of the actuator housing, the piston adapted to move between a first position and a second position where the piston moves into operative connection with the engine valve.

5. The valve actuation system of claim 4, further including a snubbing valve adapted to slow a seating velocity of the piston.

6. The valve actuation system of claim 4, further including:
   a source of the fluid;
   an accumulator disposed in the actuator housing, the accumulator in fluid connection with the source of fluid and the bore;
   a restrictive orifice disposed at the inlet to the accumulator; and
   a check valve disposed in the fluid line between the source of fluid and the actuator housing.

7. The valve actuation system of claim 4, further including a mechanical biasing element acting on the piston to move the piston towards the second position.

8. The valve actuation system of claim 4, further including a second opposing piezo electric device for moving the piston in a direction opposite the movement initiated by the first piezo electric device.

9. The valve actuation system of claim 1, further including a position sensor operable to sense the position of the engine valve.

10. A method of actuating an engine valve, comprising:
    operating a cam assembly to move an engine intake valve in a predetermined actuation pattern between a first position where the engine valve blocks a flow of fluid and a second position where the engine valve allows a flow of fluid;
    operating a valve actuator having at least one piezo electric device, the valve actuator adapted to change the movement of the engine intake valve from the predetermined actuation pattern;
    pressurizing a fluid with the at least one piezo electric device; and
    controlling the at least one piezo electric device to achieve a desired valve actuation pattern.

11. The method of claim 10, including:
    directing the pressurized fluid to a piston which engages the engine valve.

12. The method of claim 10, further including extending a piston from an actuator housing to selectively engage the engine intake valve.

13. The method of claim 12, including:
    directing a flow of fluid from a source into a bore in the actuator housing associated with the piston; and
    applying a voltage to the piezo electric device to pressurize fluid in the bore, thereby preventing the piston from moving with respect to the actuator housing.

14. The method of claim 13, further including applying a voltage to a second opposing piezo electric device, thereby allowing fluid to flow from the bore to release the piston and allow the engine valve to return to the first position.

15. The method of claim 13, wherein fluid is allowed to flow from the bore after a predetermined period of time to achieve the desired valve actuation pattern.

16. The method of claim 13, further including directing a flow of fluid from the bore to an accumulator.

* * * * *